Feb. 4, 1947.  H. J. FRAMHEIN  2,415,090
PALLET TRUCK
Filed Sept. 11, 1942  6 Sheets-Sheet 1
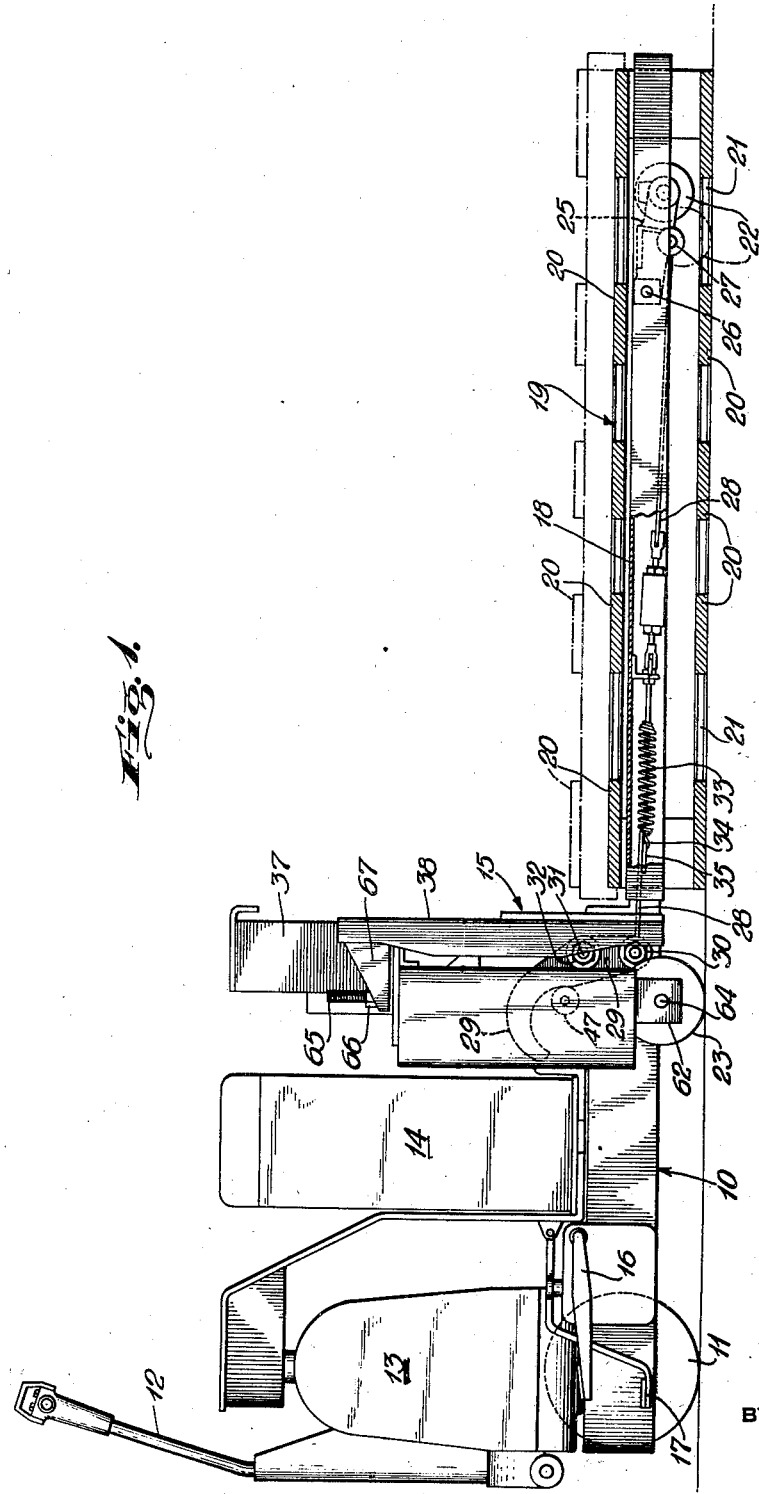
INVENTOR
H. J. Framhein
BY A. H. Golden
ATTORNEY

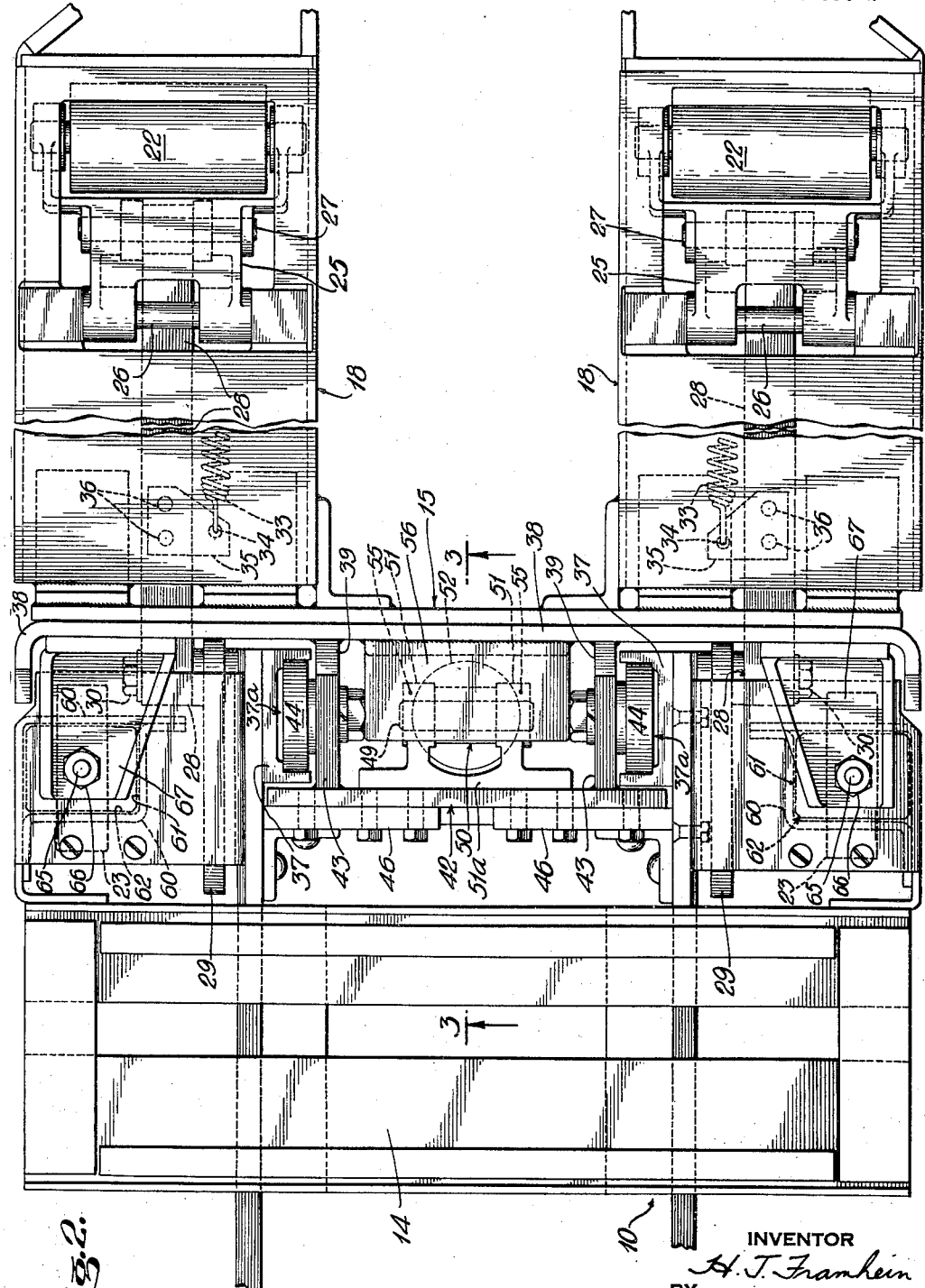

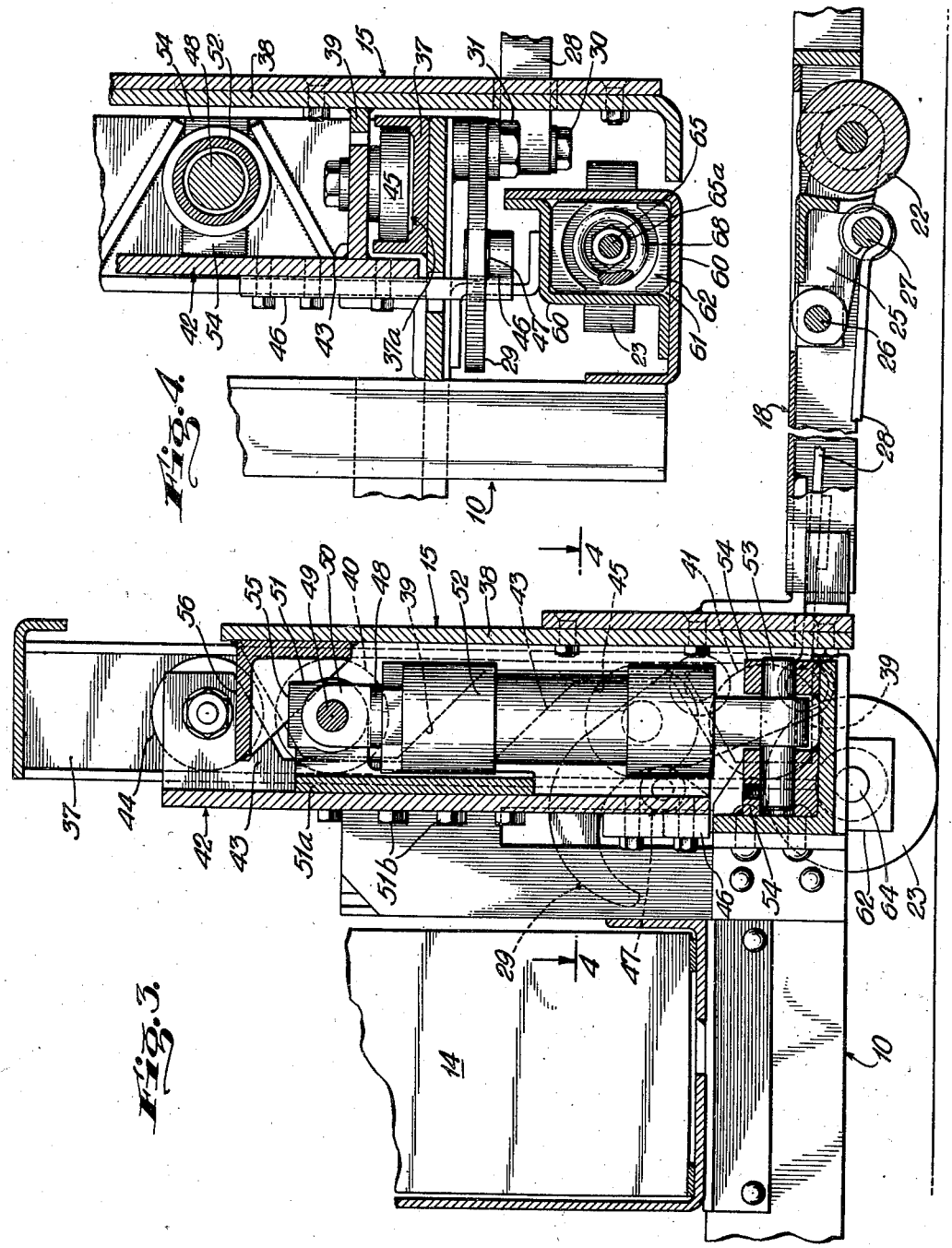

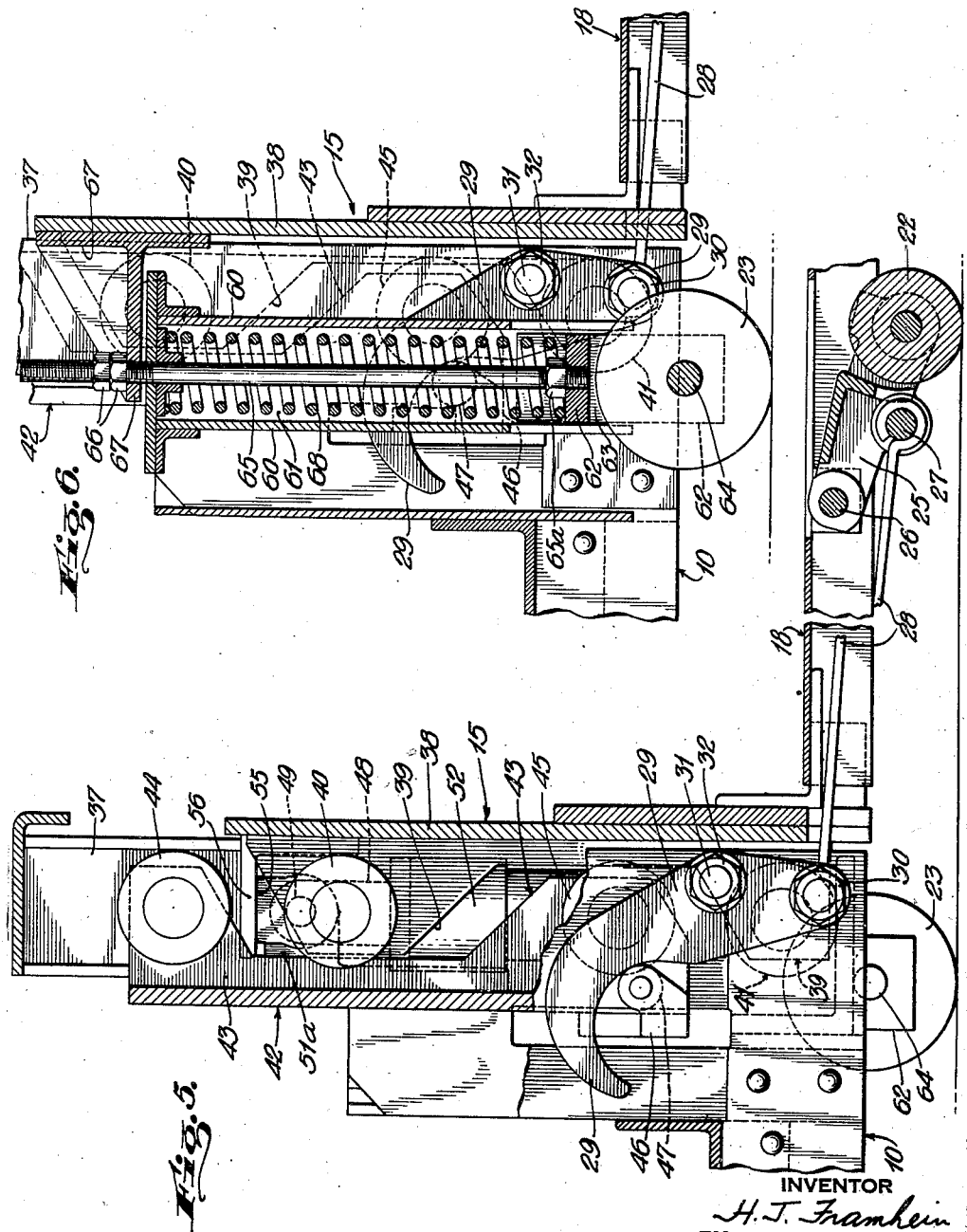

Feb. 4, 1947. H. J. FRAMHEIN 2,415,090
PALLET TRUCK
Filed Sept. 11, 1942 6 Sheets-Sheet 5
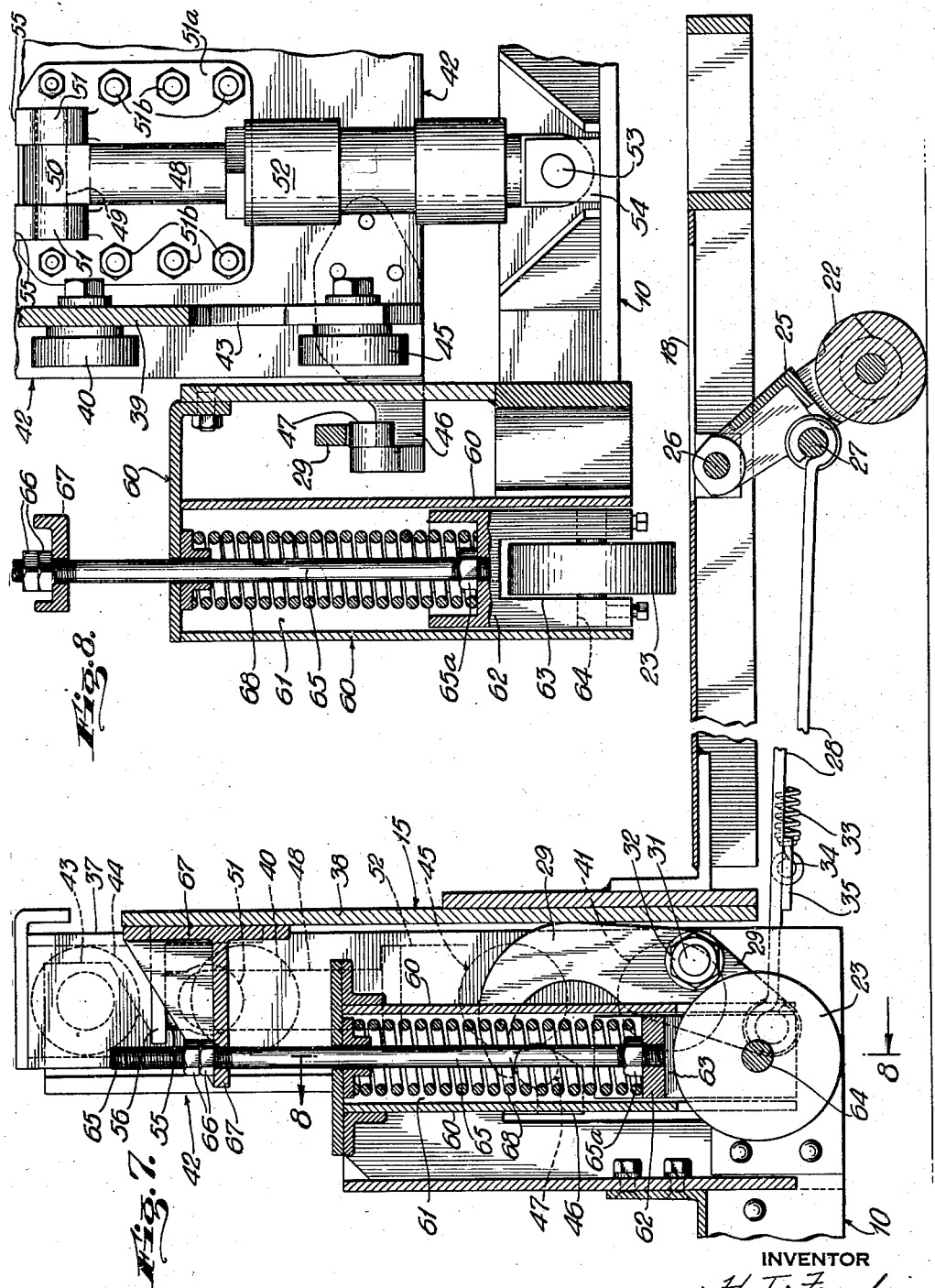
INVENTOR
H. J. Framhein
BY
A. H. Golden
ATTORNEY

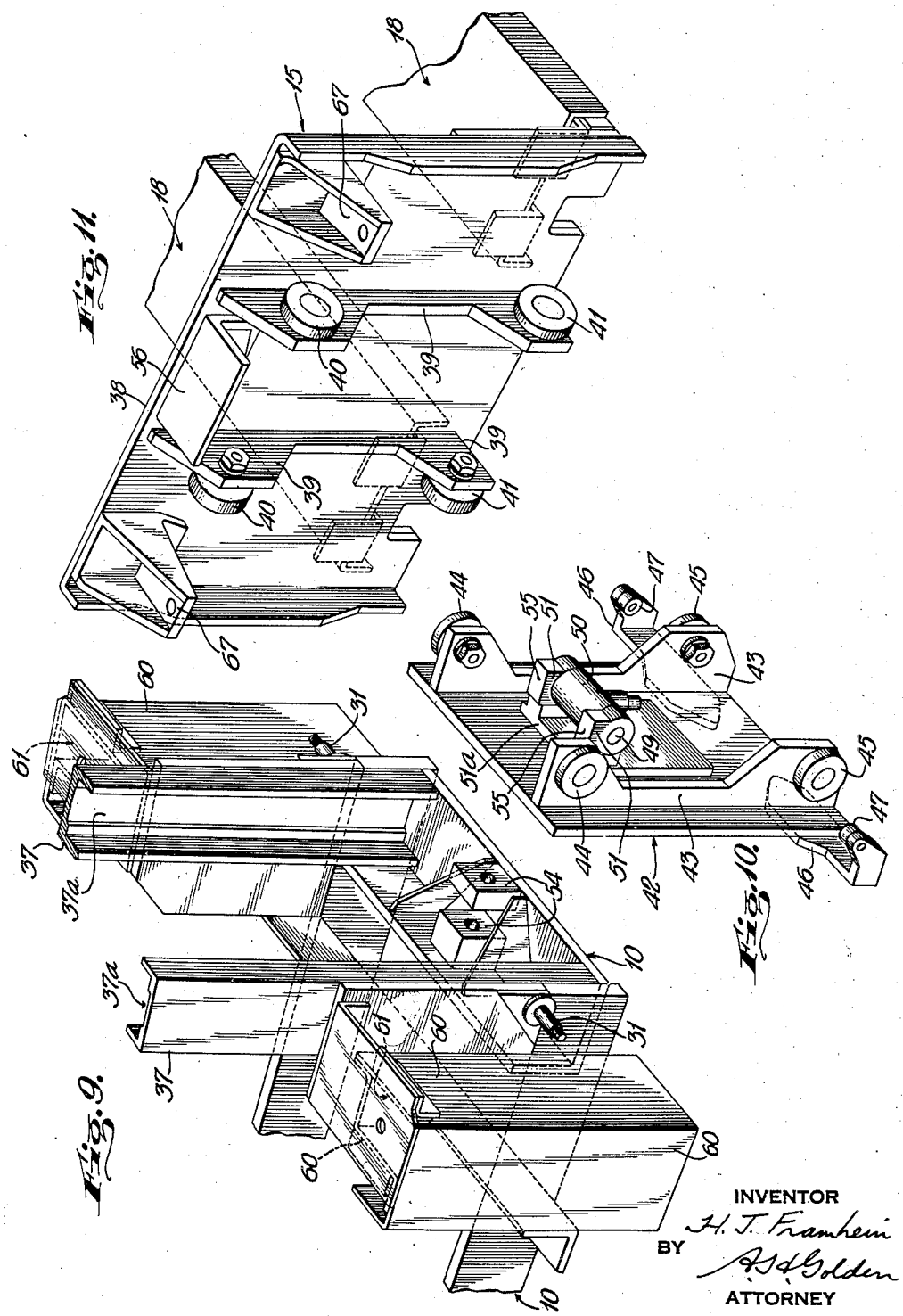

Patented Feb. 4, 1947

2,415,090

UNITED STATES PATENT OFFICE 2,415,090

PALLET TRUCK

Herbert J. Framhein, Chicago, Ill., assignor to The Yale & Towne Manufacturing Company, Stamford, Conn., a corporation of Connecticut Application September 11, 1942, Serial No. 458,035

36 Claims. (Cl. 254—2)

This invention relates to an industrial truck and more particularly to an industrial truck of the type having an elevating platform adapted to lift a skid. Even more particularly, my invention relates to an industrial truck of the type in which the platform is adapted to elevate a skid of the pallet type; that is, a skid having upper and lower floors between which the elevating platform of the truck is adapted to enter. After entering between the floors of the pallet the elevating platform is elevated and thus raises the pallet.

Trucks of the particular type are old and well known in the art, and usually have an elevating platform supported by rear lifting wheels that are pivotally mounted relatively to the platform. When the lifting wheels are moved on their mounting means relatively to the platform, they act to raise the platform. In actual operation, trucks of the particular type are manipulated so that the platform and the lifting wheels are positioned between the upper and lower floors of the pallet and with the lifting wheels placed between certain of the boards of the pallet. Thereafter, when the lifting wheels are moved with their mounting means relatively to the elevating platform of the truck, both the platform and the pallet are elevated, the wheels resting against the ground in the space between two of the boards of the pallet as set forth. A truck of this type is shown and described in the Quayle Patent No. 2,242,436 and in my earlier application Serial No. 432,177 filed on February 25, 1942, now Patent No. 2,399,596 dated April 30, 1946.

Because it is extremely difficult to move the elevating platform of a truck of the class described into a position between the floors of a pallet, it being necessary for the lifting wheels to move upwardly each time one of the floor boards of the pallet is encountered, much thought has been given to the problem of devising a pallet handling truck that may be more easily manipulated relatively to a pallet.

In the Quayle patent supra, the inventor conceived the idea of using rollers for assisting the wheels of the truck in moving upwardly each time a floor board of the pallet is encountered. Trucks of the type developed by Quayle have been in general use in the industry for a considerable period of time and have been found relatively successful.

It is the broad object of my invention to contribute to the art a lift truck of the class described, in which the elevating platform of the truck, or the pallet elevating portion thereof, may more readily be manipulated between the upper and lower floors of a pallet. While I shall describe the truck of my invention as particularly adapted to solve the long standing problem that I have outlined, and which has long confronted the industry, it should be understood that the truck of my invention may be used in various other ways, since it contributes a readily manipulated and easily handled truck that is extremely desirable, all of which will appear quite clearly from the specification that follows.

One feature of my truck whereby the broad objects of my invention are obtained, resides in the utilization of novel lifting wheels for the platform or pallet lifting portion of the truck, the said lifting wheels being maintained upwardly and away from the ground when the elevating platform is in its lowered position. This construction makes it possible for the platform of the truck to enter readily between the floors of a pallet, since the lifting wheels are held out of contact with the floor of the pallet.

A further feature of my invention resides in the construction of the truck whereby the entire truck is supported by the forward steering wheel of the truck and intermediate wheels positioned between the lifting wheels and the steering wheel, so that the truck may readily be moved about when not loaded.

A further feature of my invention resides in the means whereby the lifting wheels are first lowered against the ground, and preferably between the floor boards of a pallet, the continued movement of the lifting wheels acting to raise the elevating platform and the pallet as will be readily appreciated.

A further feature of my invention resides in the means whereby the forward end of the platform or pallet lifting portion of a truck is elevated simultaneously with the rear end of the platform, through lifting means that tend to move the lifting wheels and the forward end of the platform simultaneously, once the lifting wheels have contacted the ground.

A still further feature of my invention is the arrangement of the several parts so that when the lifting wheels have assumed the weight of the truck, the intermediate wheels that act to support the truck for movement prior to the downward actuation of the lifting wheels, are relieved of the burden of the truck so that the truck is then supported by the forward steering wheel and the lifting wheels.

A further detailed feature of this particular feature of the invention, resides in means whereby the intermediate wheels are positively moved upwardly as the elevating platform is raised, so that the said intermediate wheels will not interfere with the movement of the truck once the lifting wheels have assumed the load of the truck.

As still a further feature of this portion of my invention, the intermediate wheels are spring pressed downwardly normally against the ground so as to support the truck for movement when the lifting wheels are maintained upwardly, it being a feature of my construction that the said intermediate wheels are lifted against the pressure of the said springs and away from the ground as the elevating platform of the truck is elevated by the continued downward movement of the lifting wheels at the rear of the elevating platform.

A further feature of my invention resides in the construction of the lifting head of my truck whereby the elevating platform is supported by rollers for vertical movement relatively to the lifting head on upright channels forming a portion of the lifting head. As a further feature of the invention lifting means are utilized for the elevating platform in a form to ride on rollers in the said channels, and in spaced relation to the elevating platform, so that a predetermined lifting movement of the said lifting means is required before contact is had between said lifting means and the elevating platform. It is a detailed feature of my invention that during this movement of the lifting means relatively to the elevating platform, the lifting means act to move the lifting wheels of the rear end of the elevating platform downwardly against the ground.

I have thus outlined the more important features of my invention, in order that the contribution of my invention to the prior art may be better appreciated. I believe also that the said outline will make it easier to understand the detailed description of my invention that follows.

There are a number of important features of my invention that I have not outlined, because it occurs to me that those features will be better understood from a reading of the specification. In the claims of this application I shall claim not only those general features I have outlined, but also those other features that will become apparent from a reading of the specification. I consider my contribution to the art a very broad one, and I believe myself entitled to claims that will prevent those skilled in the art from utilizing my contribution to the art by the designing of equivalent structures incorporating the basic features of my invention.

For a description of the invention I shall now refer to the drawings, wherein Fig. 1 is a vertical view illustrating my truck with its elevating platform entered between the upper and lower floors of a standard reversible pallet.

Fig. 2 is a view looking downwardly on the rear end of the truck, certain parts being broken away.

Fig. 3 is a section taken along line 3—3 of Fig. 2.

Fig. 4 is a section taken along line 4—4 of Fig. 3.

Fig. 5 is a view similar to Fig. 3 but along a slightly different plane as will be apparent, and illustrating the several parts of the truck when the lifting wheels have been moved downwardly against the ground.

Fig. 6 is a vertical section taken parallel to Fig. 5 and with the parts in the position of Fig. 5, the section of Fig. 6 showing the mounting means for one of the intermediate wheels of my truck.

Fig. 7 is a view similar to Fig. 6 but illustrating the lifting wheels in full lifting position, and one of the intermediate wheels raised away from the ground.

Fig. 8 is a view substantially along line 8—8 of Fig. 7.

Fig. 9 is a perspective view of the forward end of the lifting head of my truck.

Fig. 10 is a perspective view of the lifting member forming part of the lifting means of the truck.

Fig. 11 is a perspective view of the forward end of the elevating platform of my truck.

Referring now more particularly to the drawings, and more especially to Fig. 1, the truck shown by me as incorporating my invention, is of that class known in the art as a motorized lift truck, and is the same type of truck that is shown in my application Serial No. 390,931 filed April 29, 1941, now Patent No. 2,327,583 dated August 24, 1943. A truck of the particular class comprises a main frame or lifting head, herein designated generally by reference numeral 10, supported by a forward steering wheel 11 that is controlled by a steering handle 12. The truck is preferably motor driven by a motor and gearing within the housing 13, and controlled by means carried on the handle 12. An electric storage battery is contained within a compartment 14 and it forms the power source for the motor. The elevating platform of the truck is designated generally by reference numeral 15 and it is elevated relatively to the lifting head 10 by suitable hydraulic mechanism actuated by a treadle 16, with the lowering of the platform being controlled by a second treadle 17.

Those features of the truck so far described are broadly quite well known and old in the art, and are referred to merely in order that a better understanding of the nature of my invention may be had.

As is well illustrated in Figs. 1 and 2, the platform 15 of the truck is U-shaped and is formed with leg portions 18 that are adapted to enter between the upper and lower floors of a pallet 19. This pallet 19 is formed of a series of spaced boards 20 between which are spaces as is well known in this art, extra wide spaces 21 being provided near the forward and rear ends of the pallet 19 for coaction with lifting wheels 22 at the rear end of the elevating platform 15.

As those skilled in the art will understand, the lifting wheels 22 of the usual pallet handling truck well known in the art, are adapted to lie normally in the position shown in the dash and dot lines of Fig. 1. In other words, in the lowermost position of the elevating platform 15, the lifting wheels 22 of the present forms of pallet handling trucks will lie in the dash and dot line position of Fig. 1, and in order to have reached the particular position relatively to the pallet 19 that is illustrated, the wheels 22 and the elevating platform will have been raised and lowered as each floor board 20 and each space between floor boards was encountered. In the truck of my invention the rear lifting wheels 22 are maintained in their full line position of Fig. 1 when the elevating platform is lowered and as the elevating platform is moved between the floor boards of a pallet, it being obvious that with the wheels so positioned, the pallet presents no resistance whatsoever to the movement of the truck into the particular position illustrated in Fig. 1.

In the usual pallet handling truck well known in the art, because in all positions of the elevating platform the lifting wheels 22 are against the ground, the truck is always supported by said lifting wheels and by a forward steering wheel such as steering wheel 11 of the present truck. In the truck of my invention, because the lifting wheels 22 are normally held away from the ground as illustrated in Fig. 1, intermediate wheels 23 are provided. It is obvious that the truck is readily supported on the wheel 11 and the wheels 23 for movement, and because the effective wheel base of the truck is very short, the truck is very much more easily manipulated than a standard truck.

As indicated earlier in my application, the downward movement of the lifting wheels 22 to assume the load of the elevating platform 15, relieves the intermediate wheels 23 of the load and the said wheels 23 are preferably actually moved away from the ground to facilitate manipulation of the truck. This withdrawal of the wheels 23 is of course a preferred feature that I believe is important, but it is obvious that certain constructions of the wheels 23, for instance caster wheels, may make it unnecessary to withdraw the wheels.

Now that I have outlined the general construction of my truck it may be well to refer to other figures of the drawings for a more detailed description of the several parts.

Referring first to Figs. 2, 5 and 9, it will be noted that my lifting wheels 22 are supported on links 25 that are pivoted through short shafts 26 to the legs 18 forming part of the elevating platform of my truck. Those skilled in the art will fully appreciate that while I have herein shown a U-shaped elevating platform having legs 18, my invention is readily adapted for use with trucks having other types of platforms and pallet lifting means. Also, because the legs 18 of my U-shaped platform 15 are duplicates, I shall describe but one leg and the lifting mechanism associated therewith, all as will be understood.

Pivoted to the link 25 through the pin 27 is a connecting rod 28. This connecting rod 28 extends to the forward end of the truck where it is suitably pivoted to what I term a lifting cam 29, it being held assembled to the lifting cam 29 by means including a nut 30. The lifting cam 29 is in turn mounted on the stub shaft 31, best shown in Fig. 9 as fixed to a part of the lifting head 10. A nut 32 serves to hold the lifting cam 29 assembled to the stub shaft 31 and the lifting head 10 as will be readily appreciated. A spring 33, best illustrated in Fig. 2, is secured at 34 to a bracket 35 riveted at 36 to the connecting rod 28. It is the function of the spring 33 to press the several parts secured to the connecting rod 28, that is the wheel supporting link 25 and the lifting cam 29, toward the position of Fig. 1, thus maintaining the lifting wheel 22 in the raised position shown in Fig. 1. For a more detailed description of the formation of the connecting rod 28 whereby it is readily adjustable, reference may be had to my application Serial No. 432,177. For the purposes of the present application it may be considered that the connecting rod 28 is formed of one piece extending from the shaft 27 to the lifting cam 29 for the operation to be presently fully disclosed.

As is probably best illustrated in Fig. 9, the lifting head 10 is formed with a pair of channeled uprights 37, and it is within the channels 37a of the uprights that the rollers supporting the lifting member of Fig. 10 and the elevating platform of Fig. 11 are adapted to slide. As is best shown in Fig. 11, the elevating platform 15 has not only a pair of leg members 18 but is also formed with a vertical standard 38. Suitably secured as by welding or otherwise to the vertical standard 38 are a pair of spaced roller supporting brackets 39, and on each of these roller supporting brackets there is mounted a pair of upper rollers 40 and lower rollers 41. These rollers ride of course within the channels 37a of the upright channel members 37 as clearly illustrated in the drawings, and serve to hold the elevating platform 15 in assembled relation to the lifting head 10, as well as to guide the elevating platform for vertical movement relatively to the lifting head. It may be well to indicate at this point that my truck is preferably fabricated by the welding and bolting of a series of metal members into the various integral relationships illustrated, that being the practice at this time. As manufacturing practices change, it will be readily appreciated that the truck parts will be formed in other ways.

What I term the lifting member of my invention, is designated generally by reference numeral 42 in Fig. 10. It also is equipped with spaced roller supporting brackets 43, and these brackets support upper rollers 44 and lower rollers 45. These rollers ride in the channels 37a of the channeled uprights 37, and in vertically spaced relation to the rollers 40 and 41 on the elevating platform 15, all as is well illustrated in such drawings as Fig. 3 and Fig. 5. The series of rollers described are of standard construction and operate as is usual in this art.

At each side of the lifting member 42 there is welded a rather peculiar shaped bracket 46 as is best shown in Fig. 8 and Fig. 10, and supported on each of the said brackets 46 is a roller 47. These rollers 47 are intended to cooperate respectively with the lifting cams 29 at each side of the truck, it being obvious that when the lifting member 42 is moved upwardly, with its rollers 44 and 45 riding in the channels 37a of the uprights 37, the rollers 47 must function to rotate the lifting cams 29 in a clockwise direction about the stub shafts 31. This in turn pulls the connecting rods 28 and effects the movement of the lifting wheels 22 from the first position of Fig. 1 to the intermediate position of Fig. 5 and then to the final position of Fig. 7.

For imparting this upward lifting movement to the lifting member 42, I employ a hydraulic lifting assembly of a general type well known in this art, and to which I shall refer but briefly. As indicated earlier in the specification, the hydraulic lifting mechanism is operated by the foot treadle 16. The lifting ram itself is indicated by reference numeral 48 and is best shown in Figs. 3, 8 and 10. It is assembled to the lifting member 42 through a shaft 49 extending through a sleeve portion 50 secured to the end of the ram, and bearing at its ends in ears 51 of a bracket 51a bolted to the lifting member 42 by a series of bolts and nuts 51b. It is obvious that in this way, the ram 48 is adapted for some pivotal movement relatively to the lifting member 42 as it imparts vertical lifting movement to the said lifting member 42. The ram 48 is itself housed within a usual type of hydraulic cylinder 52, the said cylinder being pivoted at its lower end through a stub shaft 53 to lugs 54 welded to form an integral part of the lifting head 10. This form of mounting allows for movement of the cylinder and ram assembly relatively to the lifting head as may be required to compensate for "weaving" of the lifting member relatively to the lifting head. The desirability of the particular construction will be appreciated by those skilled in the art.

Each of the ears 51 of the bracket 51a through which the ram 48 is secured to the lifting member 42 by the shaft 49, is formed with a flat upper surface 55, and the said surfaces 55 are adapted to coact with the under surface of a ledge 56 welded to the standard 38 of the lifting platform 15 as best illustrated in Fig. 11.

I believe it will be well now to describe the operation of the lifting member 42 whereby it lifts the elevating platform 15.

Referring now to Figs. 1, 2 and 3, it will be noted that when the elevating platform 15 is in its position of Figs. 1, 2 and 3, the upper rollers 44 of the lifting member 42 are maintained within the channels 37a of the uprights 37 just above the upper rollers 40 of the elevating platform 15. Similarly, the lower rollers 45 of the lifting member 42 are located somewhat above the lower rollers 41 of the elevating platform. The lifting wheels 22 are maintained in their raised position by the springs 33 acting through connecting rods 28 and links 25, the connecting rods 28 acting also to maintain the cams 29 in the position of Fig. 3 and against the rollers 47 of the lifting member 42. The ram 48 is in its fully lowered position as determined by its rollers 40 and 41 in the channels 37a of the uprights 37.

If with the parts in the position illustrated in Figs. 1, 2 and 3, the pump of the lifting mechanism is operated by treadle 16, it is obvious that the ram 48 will be moved upwardly from its position of Fig. 3 to its position of Fig. 5. This movement of the ram will effect a vertical movement of the lifting member 42, and will cause the rollers 47 to rotate the lifting cams 29 from the position of Figs. 1 and 3 to the position of Fig. 5. This of course effects a lowering of the lifting wheels 22 to the position of Fig. 5 and to the dotted line position of Fig. 1 into the space 21 between the floor boards 20 of the pallet 19. In other words, in Fig. 5 the lifting wheels 22 are about to assume the weight of the elevating platform 15 and to raise that elevating platform to lift the pallet 19.

Returning again to the position of the parts in Fig. 3, it will be noted that the upper surfaces 55 of the ears 51 of the lifting member 42 are spaced vertically from the lower surface of the ledge 56 of the elevating platform 15.

It will be noted that in the position of the parts in Fig. 5, the upper surfaces 55 of the ears 51 have now come up against the lower surface of the ledge 56. In other words, during the movement of the parts from the position of Fig. 3 to the position of Fig. 5, there has been no elevating movement of the platform 15 and the platform has remained in its lowered position relatively to the lifting head, and therefore it is positioned relatively to the pallet as illustrated in full lines in Fig. 1.

Continued operation of the hydraulic mechanism effects a further upward movement of the ram 48 from the position of Fig. 5 to the position of Fig. 7. This movement effects a further rotation of the cams 29 by the rollers 47, and a consequent further movement of the lifting wheels 22 with their links 25, so that the rear end of the elevating platform 15 is raised a predetermined amount. Simultaneously, the surfaces 55 of the ears 51 have contacted the under surface of the ledge 56 of the elevating platform 15 and have raised the forward end of the elevating platform 15. In other words, once the lifting member 42 lowers the lifting wheels 22 against the ground to the position of Fig. 5, the continued movement of the lifting member 42 thereafter effects a simultaneous lifting of the forward and rear ends of the elevating platform through continued upward movement of the ledge 56 and the continued lowering movement of the lifting wheels 22.

It is obvious now that the several parts will remain in the position of Fig. 7 until such time as the lowering treadle 17 is depressed allowing an escape of fluid behind the ram 48 in the usual manner well known in this art. The elevating platform will then be lowered back to its position of Figs. 1, 3 and 5, after which the springs 33 will raise the wheels 22 and through cams 29 continue the downward movement of the lifting member 42 to its position of Fig. 3.

I shall now describe the function and operation of the intermediate wheels 23. There is of course an intermediate wheel for each side of the lifting head, it being a preferred feature of my invention that these intermediate wheels be carried by the lifting head.

Referring more particularly to Figs. 2, 6, 8 and 9, it will be noted that at each side of the lifting head a series of metal parts designated by reference numeral 60, and adapted to form a cylinder 61 in which a wheel support 62 is mounted for vertical sliding. Each wheel support 62 is bifurcated at 63 to hold in assembled relation thereto a wheel 23 on an axle 64. A rod 65 is threaded into each of the wheel supports 62 and is then held by a nut 65a in assembled relation thereto. Each rod 65 extends outwardly from the cylinders 61 and is threaded at its upper end for a pair of interlocking nuts 66, it being the function of these nuts to coact with ledge brackets 67 secured at each side of the elevating platform standard 38 as best shown in Fig. 11. A spring 68 is suitably housed within each cylinder 61 and is adapted to maintain each wheel support 62 pressed downwardly so as to hold the intermediate wheels 23 in their position of Figs. 1 and 6 wherein they will support the truck for movement.

With the intermediate wheels 23 in the position of Fig. 6, the pair of interlocking nuts 66 are suitably adjusted so as to lie against the upper surfaces of the ledge brackets 67.

It will now be quite obvious that as the elevating platform 15 is raised from its position of Figs. 5 and 6, to the position of Figs. 7 and 8, it will act through the ledge brackets 67 and interlocking nuts 66 to raise the wheel supports 62 against the pressure of the springs 68. This will effect the raising of the intermediate wheels 23 from their position against the ground shown in Figs. 1, 5 and 6 to the position of Figs. 7 and 8 wherein they are completely away from the ground and do not in any way affect the movement of the truck on the rear lifting wheels 22 and the forward steering wheel 23.

It is now obvious that when the elevating platform is in its fully lowered position, the lifting wheels 22 are raised so as not to obstruct the movement of the truck, the truck being fully supported by the forward steering wheel 11 and the intermediate wheels 23 so that it may be readily inserted between the floor boards of the reversible pallet 19 as illustrated in Fig. 1. It is also obvious that the first operation of the lifting member 42 by the ram 48 acts to move the wheels 22 against the ground, while simultaneously bringing the surfaces 55 of the ears 51 of the lifting member 42 against the ledge 56. Further movement of lifting member 42 raises simultaneously the forward and rear ends of the elevating platform 15. It is further obvious, that the upward movement of the elevating platform 15 effects the lifting movement of the intermediate wheels 23 so as to withdraw those wheels to the position of Fig. 7, in which position they do not in any way obstruct the free movement of the truck on the lifting wheels 22 and the forward wheel 11.

It may be well to add that while I prefer to use the coordinated operation of the several parts and the particular sequential operations I have outlined, the important features of my invention are otherwise usable, and in themselves are valuable contributions.

I believe that the operation and construction of my invention will now be quite clear to those skilled in the art.

I now claim:

1. In a truck of the class described, a lifting head, an elevating platform, means mounting the said elevating platform for elevating movement relatively to said lifting head, lifting wheels, means whereby said lifting wheels are movably mounted on said elevating platform and are maintained off the ground when said elevating platform is lowered relatively to said lifting head so as not to interfere with the movement of said truck on the ground, lifting means for lifting said elevating platform relatively to said lifting head, and means whereby said lifting means effects the movement of said lifting wheels for lowering said lifting wheels relatively to said elevating platform.

2. In a truck of the class described, a lifting head, an elevating platform, means mounting the said elevating platform for elevating movement relatively to said lifting head, lifting wheels movably mounted on said elevating platform, means maintaining said lifting wheels off the ground when said platform is lowered relatively to said lifting head, so as not to interfere with the movement of said truck on the ground, lifting means for lifting said elevating platform relatively to said lifting head, and means whereby operation of said lifting means effects the movement of said lifting wheels for lowering said lifting wheels against the ground.

3. In a truck of the class described, a lifting head, an elevating platform, means mounting the said elevating platform for elevating movement relatively to said lifting head, lifting wheels, means whereby said lifting wheels are movably mounted on said elevating platform and are normally maintained off the ground so as not to interfere with the movement of said truck on the ground, lifting means on said lifting head, means of connection between said lifting means and said lifting wheels for lowering said lifting wheels against the ground, and means whereby the continued operation of said lifting means lifts said elevating platform relatively to said lifting head once said lifting wheels have been lowered against the ground while continuing simultaneously the lowering of said wheels relatively to said elevating platform.

4. In a truck of the class described, a lifting head, an elevating platform, means mounting the said elevating platform for elevating movement relatively to said lifting head, lifting wheels movably mounted on said elevating platform and normally maintained so as not to interfere with the movement of said truck on the ground, lifting means on said lifting head, means of connection between said lifting means and said lifting wheels and elevating platform whereby operation of said lifting means first effects the lowering of said lifting wheels against the ground and then lifts said elevating platform relatively to said lifting head while simultaneously continuing the lowering of said lifting wheels relatively to said elevating platform.

5. In a truck of the class described, a lifting head, an elevating platform, means mounting the front end of said elevating platform for elevating movement on said lifting head and with the rear end of said platform held spaced from the ground even when said platform is in its lowered position on said lifting head, lifting wheels movably mounted on said elevating platform and normally maintained upwardly relatively to said elevating platform and off the ground when said elevating platform is in said lowered position so as not to interfere with the movement of said truck, lifting means for lifting said elevating platform relatively to said lifting head, and means whereby operation of said lifting means effects the movement of said lifting wheels for lowering said lifting wheels relatively to said elevating platform against the ground.

6. In a truck of the class described, a lifting head, an elevating platform, means mounting the front end of said elevating platform for elevating movement on said lifting head and with the rear end of said platform held spaced from the ground even when said platform is in its lowered position on said lifting head, lifting wheels movably mounted on said elevating platform, means maintaining said lifting wheels upwardly relatively to said elevating platform and off the ground when said platform is in its lowered position relatively to said lifting head so as not to interfere with the movement of said truck, lifting means for lifting said elevating platform relatively to said lifting head, and means whereby operation of said lifting means effects the movement of said lifting wheels for lowering said wheels against the ground.

7. In a truck of the class described, a lifting head, an elevating platform, means mounting the front end of said elevating platform for elevating movement on said lifting head and with the rear end of said platform held spaced from the ground when said platform is in its lowered position on said lifting head, lifting wheels movably mounted on said elevating platform, means maintaining said lifting wheels off the ground when said platform is in its lowered position relatively to said lifting head, so as not to interfere with the movement of said truck on the ground, lifting means on said lifting head, means of connection between said lifting means and said lifting wheels and elevating platform whereby operation of said lifting means first effects the lowering of said lifting wheels against the ground and then lifts said elevating platform relatively to said lifting head while simultaneously continuing the lowering of said lifting wheels.

8. In a truck of the class described, a wheel supported lifting head, an elevating platform, means mounting the front end of said elevating platform for elevating movement on said lifting head and with the rear end of said platform held spaced from the ground when said platform is in its lowered position on said lifting head, lifting wheels movably mounted on said elevating platform, means maintaining said lifting wheels off the ground when said platform is in its lowered position relatively to said lifting head so as not to interfere with the movement of said truck on the wheels of said lifting head, lifting means on said lifting head, and means of connection between said lifting means and said lifting wheels for lowering said lifting wheels against the ground to relieve at least certain of the wheels supporting said lifting head of the load of said elevating platform.

9. In a truck of the class described, a lifting head, an elevating platform, means mounting the said elevating platform for elevating movement relatively to said lifting head, support wheels for supporting said lifting head and elevating platform for movement when said elevating platform is in its lowered position, lifting wheels, means whereby said lifting wheels are movably mounted on said elevating platform and are maintained off the ground when said platform is in its lowered position so as not to interfere with the movement of said truck lifting head, lifting means for lifting said elevating platform relatively to said lifting head, and means whereby operation of said lifting means effects the lowering of said lifting wheels against the ground to lift said elevating platform and thereby relieve at least certain of the support wheels of the load of said elevating platform.

10. In a truck of the class described, a lifting head, forward and rear wheels supporting said lifting head for movement, an elevating platform, means mounting the forward end of said elevating platform for lifting movement on said lifting head, the rear end of said elevating platform extending considerably beyond the rear wheels of said lifting head so that a load on said elevating platform will tend to tip the truck, lifting wheels for said elevating platform, means mounting said wheels on said platform and initially positioned so that said wheels are away from the ground so as not to interfere with the movement of said lifting head and platform as a unit on said lifting head wheels, lifting means on said lifting head, and means of connection between said lifting means and said lifting wheels for lowering said wheels against the ground.

11. In a truck of the class described, a lifting head, wheels supporting said lifting head for movement, an elevating platform, upright channels formed on said lifting head, rollers on said elevating platform cooperating with said channels and mounting the forward end of said elevating platform for lifting movement on said lifting head, the rear end of said elevating platform extending considerably beyond the rear wheels of said lifting head so that a load on said elevating platform will tend to tip the truck, lifting wheels for the rear end of said elevating platform, means mounting said lifting wheels for movement relatively to said platform and initially positioned so that said lifting wheels are away from the ground whereby not to interfere with the movement of said lifting head and platform as a unit when said elevating platform is lowered, lifting means on said lifting head, and means of connection between said lifting means and said lifting wheels and elevating platform whereby operation of said lifting means effects the lowering of said lifting wheels against the ground and lifts the said elevating platform relatively to said lifting head.

12. In a truck of the class described, a lifting head, forward and rear wheels supporting said lifting head for movement, an elevating platform, upright channels formed on said lifting head, rollers on said elevating platform cooperating with said channels and mounting the forward end of said elevating platform for lifting movement on said lifting head, the rear end of said elevating platform extending considerably beyond the rear wheels of said lifting head so that a load on said elevating platform will tend to tip the truck, lifting wheels for the rear end of said elevating platform, means mounting said wheels for movement relatively to said platform and initially positioned so that said wheels are away from the ground whereby not to interfere with the movement of said lifting head and platform as a unit on said lifting head wheels, lifting means on said lifting head, rollers mounting said lifting means on said channels for vertical movement, a portion of said lifting means contacting the said elevating platform after said lifting means has moved vertically a predetermined amount whereby to lift the forward end of said platform, and means of connection between said lifting wheels and said lifting means whereby the movement of said lifting means said predetermined amount lowers said lifting wheels relatively to said elevating platform.

13. In a truck of the class described, a lifting head, a pair of upright channels on said lifting head, an elevating platform, rollers whereby the forward end of said platform is mounted on said channels for sliding movement, a lifting member, rollers mounting said lifting member on said channels for vertical sliding movement, a hydraulic lifting mechanism extending between said lifting head and said lifting member for imparting vertical lifting movement to said lifting member, wheel supporting links pivoted to the rear end of said platform, springs maintaining said links in an upward position with the wheels thereon spaced from the ground, forward and intermediate wheels supporting said lifting head and elevating platform for transport movement when said links and wheels are so held, means extending from said links to the forward end of the truck for actuation by said lifting member, means on said lifting member adapted to actuate said means extending from said links whereby to swing said links downwardly to bring the wheels against the ground to lift the rear end of said elevating platform, and to contact the forward end of said elevating platform whereby to lift also the rear end of said platform.

14. In a lifting truck of the class described, a lifting head, an elevating platform mounted on said lifting head for lifting movement relatively thereto, a pair of wheels, means mounting said wheels in supporting relation to said lifting head and for vertical movement relatively to said lifting head, spring means pressing said wheels downwardly relatively to said lifting head, lifting means on said lifting head for lifting said elevating platform relatively to said lifting head, and means whereby said lifting means lift also said wheels relatively to said lifting head against the pressure of said spring means.

15. In a lifting truck of the class described, a lifting head, an elevating platform mounted on said lifting head for lifting movement relatively thereto, forward and rear wheels for said lifting head, means mounting said rear wheels in supporting relation to said lifting head and for vertical movement relatively to said lifting head, spring means pressing said wheels downwardly relatively to said lifting head, lifting means on said lifting head, means whereby said lifting means lift said platform relatively to said lifting head, and means whereby said lifting means lift said rear wheels relatively to said lifting head against the pressure of said springs.

16. In a truck of the class described, a lifting head, an elevating platform, means mounting the forward end of said elevating platform for lifting movement on said lifting head, the rear end of said elevating platform extending considerably beyond said lifting head so that a load on said elevating platform will tend to tip the truck, forward and intermediate wheels supporting said lifting head and elevating platform for movement, lifting wheels for the rear end of said platform, means mounting said lifting wheels for movement relatively to said platform, springs adapted to press said mounting means whereby to maintain said lifting wheels against said platform and off the ground when said elevating platform is lowered relatively to said lifting head, lifting means on said lifting head, and means of connection between said lifting means and said lifting wheels for lowering said wheels against the ground to raise the rear end of said elevating platform.

17. In a truck of the class described, a lifting head, forward and rear wheels supporting said lifting head for movement, means mounting said rear wheels on said lifting head for vertical movement relatively thereto, springs normally pressing said wheels against the ground in supporting relation to said lifting head, an elevating platform, means mounting the forward end of said elevating platform for lifting movement on said lifting head, the rear end of said elevating platform extending considerably beyond the rear wheels of said lifting head so that a load on said elevating platform will tend to tip the truck, lifting wheels for the rear end of said platform, means mounting said wheels for movement relatively to said platform and adapted to maintain said wheels against said platform and off the ground, lifting means on said lifting head, and means of connection between said lifting means and said lifting wheels and said rear wheels whereby said lifting means lowers said lifting wheels to assume the load of said platform and raises said rear wheels.

18. In a truck of the class described, a lifting head, a forward steering wheel for said lifting head, an elevating platform, means mounting the forward end of said elevating platform for lifting movement on said lifting head, intermediate wheels mounted on said lifting head and cooperating with said forward steering wheel to support said truck for transport movement, said platform even in its lowermost position on said lifting head being held clear of the ground contacted by said wheels, lifting wheels for the rear end of said platform normally maintained in close juxtaposed relation to said platform and off the ground when said platform is in said lowermost position, lifting means on said lifting head, and means of connection between said lifting means and said lifting wheels for moving said lifting wheels against the ground to lift the platform from its lowermost position.

19. In a truck of the class described, a lifting head, forward and rear wheels supporting said lifting head for movement, means mounting said rear wheels on said lifting head for vertical movement relatively thereto, springs normally pressing said wheels against the ground in supporting relation to said lifting head, an elevating platform, means mounting the forward end of said elevating platform for lifting movement on said lifting head, the rear end of said elevating platform extending considerably beyond the rear wheels of said lifting head so that a load on said elevating platform will tend to tip the truck, lifting wheels for said elevating platform, means mounting said lifting wheels for movement relatively to said platform and initially positioned so that said wheels are away from the ground whereby not to interfere with the movement of said lifting head and platform as a unit on said lifting head wheels, lifting means on said lifting head, and means of connection between said lifting means and said lifting wheels and elevating platform whereby operation of said lifting means first effects the lowering of said lifting wheels against the ground and then lifts said elevating platform relatively to said lifting head and said rear wheels against the pressure of said springs while simultaneously continuing the lowering of said lifting wheels.

20. In a truck of the class described, a lifting head, a steering and supporting wheel for said lifting head, an elevating platform, means mounting said elevating platform with its front end in assembled relation to said lifting head and for elevating movement relatively thereto, lifting wheels for the rear end of said platform, means mounting said lifting wheels for movement relatively to said elevating platform and holding said wheels against said platform and away from the ground when the front end of said elevating platform is in a lowered position relatively to said lifting head, wheels intermediate said lifting wheels and said steering wheel for cooperation with said steering wheel to support said lifting head and platform for movement when said platform is in said lowered position, lifting means for lifting said elevating platform relatively to said lifting head, and means whereby said lifting means lowers said lifting wheels to lift the rear end of said platform and lifts the front end of said platform.

21. In a truck of the class described, a lifting head, a steering and supporting wheel for said lifting head, an elevating platform, means mounting said elevating platform with its front end in assembled relation to said lifting head and for elevating movement relatively thereto, lifting wheels for the rear end of said platform, means mounting said lifting wheels for movement relatively to said elevating platform and holding said wheels against said platform and away from the ground when the front end of said elevating platform is in a lowered position relatively to said lifting head, wheels intermediate said lifting wheels and said steering wheel for cooperation with said steering wheel to support said lifting head and platform for movement when said platform is in said lowered position, lifting means for lifting said elevating platform relatively to said lifting head, and means whereby said lifting means lowers said lifting wheels to lift the rear end of said platform and lifts the front end of said platform and raises said intermediate wheels so that said truck is supported only by said lifting wheels and said steering wheel.

22. In a truck of the class described, a lifting head, an elevating platform, means mounting the said elevating platform for elevating movement relatively to said lifting head, lifting wheels movably mounted on said elevating platform, means whereby when said elevating platform is in its lowered position relatively to said lifting head said lifting wheels are maintained upwardly relatively to the truck and off the ground so as not to interfere with the movement of said truck on the ground, lifting means for lifting said elevating platform relatively to said lifting head, and means whereby said lifting means lifts the forward end of said elevating platform on its mounting means and effects the lowering of said lifting wheels relatively to said elevating platform.

23. In a truck of the class described, a lifting head, an elevating platform, means mounting the said elevating platform for elevating movement relatively to said lifting head, lifting wheels movably mounted on said elevating platform, lifting means for lifting the forward end of said elevating platform on said mounting means relatively to said lifting head, means holding said lifting wheels in position relatively to said elevating platform when said elevating platform is in its fully lowered position wherein said lifting wheels are spaced from the ground, and actuating means whereby said means are actuated upon operation of said lifting means to lower said lifting wheels relatively to said elevating platform.

24. In a truck of the class described, a lifting head, an elevating platform, means mounting the said elevating platform for elevating movement relatively to said lifting head, forward and intermediate wheels supporting said truck for movement when said elevating platform is in its lowered position, lifting wheels movably mounted on said elevating platform, lifting means for lifting the forward end of said elevating platform on said mounting means relatively to said lifting head, means holding said lifting wheels in position relatively to said elevating platform when said elevating platform is in its fully lowered position wherein said lifting wheels are spaced from the ground, and actuating means whereby said means are actuated upon operation of said lifting means to lower said lifting wheels relatively to said elevating platform.

25. In a truck of the class described, a lifting head, an elevating platform, means mounting the said elevating platform for elevating movement relatively to said lifting head, forward and intermediate wheels supporting said truck for movement when said elevating platform is in its lowered position, lifting wheels movably mounted on said elevating platform and maintained upwardly relatively to the truck and off the ground when said elevating platform is in its lowered position, so as not to interfere with the movement of said truck on the ground, lifting means for lifting said elevating platform relatively to said lifting head, and means whereby said lifting means effects the movement of said lifting wheels for lowering said lifting wheels relatively to said elevating platform.

26. In a truck of the class described, a lifting head, an elevating platform, means mounting the forward end of said elevating platform for lifting movement relatively to said lifting head, lifting means for lifting said elevating platform relatively to said lifting head, a lifting wheel link, means rotatably mounting said lifting wheel link on the underside of the rear of said elevating platform for lifting said platform, a lifting wheel mounted on said lifting wheel link, a tension member extending under the elevating platform for rotating said lifting wheel link in a downward direction, and means whereby when said elevating platform is in its lowered position said tension member and lifting wheel link are positioned with said lifting wheel off the ground.

27. In a truck of the class described, a lifting head, an elevating platform, means mounting the forward end of said elevating platform for lifting movement relatively to said lifting head, lifting means for lifting said elevating platform relatively to said lifting head, support wheels for said truck on which said truck is adapted for movement when said elevating platform is in its lowered position, a lifting wheel link, means rotatably mounting said lifting wheel link on the underside of the rear of said elevating platform for lifting said platform, a lifting wheel mounted on said lifting wheel link, a tension member extending under the elevating platform for rotating said lifting wheel link in a downward direction, and means whereby when said elevating platform is in its lowered position said tension member is positioned to maintain said lifting wheel link so that said lifting wheel is off the ground.

28. In a truck of the class described, a lifting head, an elevating platform, means mounting said elevating platform for lifting movement relatively to said lifting head, support wheels for said truck on which said truck is adapted for movement when said elevating platform is in its lowered position, lifting wheels for said elevating platform, means mounting said lifting wheels for vertical movement relatively to said platform whereby to lift the said elevating platform relatively to said lifting head when said wheels are moved, lifting means for lifting said elevating platform relatively to said lifting head, and means whereby said lifting means lifts the forward end of said elevating platform and certain of said support wheels, while effecting the lowering movement of said lifting wheels to lift the rear end of said elevating platform.

29. In a truck of the class described, a lifting head, an elevating platform, means mounting said elevating platform for lifting movement relatively to said lifting head, support wheels for said truck on which said truck is adapted for movement when said elevating platform is in its lowered position, lifting wheels for said elevating platform, means mounting said lifting wheels for vertical movement relatively to said platform whereby to lift the said elevating platform relatively to said lifting head when said wheels are moved downwardly, said means holding said lifting wheels off the ground when said elevating platform is in its lowered position, lifting means for lifting said elevating platform relatively to said lifting head, and means whereby said lifting means lifts the forward end of said elevating platform and certain of said support wheels while effecting the lowering movement of said lifting wheels to lift the rear end of said elevating platform.

30. In a truck of the class described, a lifting head, an elevating platform, means mounting said elevating platform for lifting movement relatively to said lifting head, lifting means for lifting said elevating platform relatively to said lifting head on said mounting means, intermediate wheels mounted on said lifting head, means whereby said intermediate wheels are positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said elevating platform for lifting the rear of said platform when moved downwardly relatively thereto, means whereby when said elevating platform is lowered relatively to said lifting head said wheel carrying means are maintained in a position with said lifting wheels off the ground, and means whereby the operation of said lifting means effects the movement of said wheel carrying means to lower the said lifting wheels against the ground and to lift the rear of said platform.

31. In a truck of the class described, a lifting head, an elevating platform, means mounting said platform for lifting movement relatively to said lifting head, lifting means for lifting said elevating platform relatively to said lifting head on said mounting means, intermediate wheels for said truck, means whereby said intermediate wheels are positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said elevating platform for lifting the rear of said platform when moved downwardly relatively thereto, means whereby when said elevating platform is lowered relatively to said lifting head said wheel carrying means are maintained in a position with said lifting wheels off the ground, and means whereby the operation of said lifting means effects the movement of said wheel carrying means to lower the said lifting wheels against the ground to lift the rear of said platform.

32. In a truck of the class described, a lifting head, an elevating platform, means mounting the said elevating platform for elevating movement relatively to said lifting head, support wheels for supporting said lifting head and elevating platform for movement when said elevating platform is in its lowered position relatively to said lifting head, lifting wheels movably mounted on said elevating platform and maintained upwardly and off the ground when said elevating platform is lowered so as not to interfere with the movement of said truck on said support wheels, lifting means for lifting said elevating platform relatively to said lifting head, and means whereby said lifting means effects the movement of said lifting wheels for lowering said lifting wheels relatively to said elevating platform.

33. In a truck of the class described, a lifting head, an elevating platform, means mounting the said elevating platform for elevating movement relatively to said lifting head, forward and intermediate wheels for supporting said lifting head and elevating platform for movement when said elevating platform is lowered relatively to said lifting head, lifting wheels movably mounted on said elevating platform, means maintaining said lifting wheels off the ground when said platform is lowered relatively to said lifting head, so as not to interfere with the movement of said truck on said forward and intermediate wheels, lifting means for lifting said elevating platform relatively to said lifting head, and means whereby operation of said lifting means effects the movement of said lifting wheels for lowering said lifting wheels against the ground.

34. In a truck of the class described, a lifting head, an elevating platform, means mounting the said elevating platform for elevating movement relatively to said lifting head, support wheels for supporting said lifting head and elevating platform for movement when said elevating platform is lowered relatively to said lifting head, lifting wheels movably mounted on said elevating platform and normally maintained so as not to interfere with the movement of said truck on said support wheels, lifting means for lifting said elevating platform relatively to said lifting head, and means whereby said lifting means effects the movement of said lifting wheels for lowering said lifting wheels relatively to said elevating platform while lifting certain of said support wheels.

35. In a truck of the class described, a lifting head, an elevating platform, means mounting the said elevating platform for elevating movement relatively to said lifting head, forward and intermediate wheels for supporting said lifting head and elevating platform for movement when said elevating platform is lowered relatively to said lifting head, lifting wheels movably mounted on said elevating platform, means maintaining said lifting wheels off the ground when said platform is lowered relatively to said lifting head, so as not to interfere with the movement of said truck on said forward and intermediate wheels, lifting means for lifting said elevating platform relatively to said lifting head, and means whereby operation of said lifting means effects the movement of said lifting wheels for lowering said lifting wheels against the ground while lifting said intermediate wheels.

36. In a truck of the class described, a lifting head, an elevating platform, means mounting the forward end of said platform for lifting movement relatively to said lifting head, lifting means for lifting said platform relatively to said lifting head on said mounting means, lifting wheels for the rear end of said platform, wheel carrying means for said wheels movably mounted on the rear end of said platform, spring means pressing said wheel carrying means upwardly toward said platform and with said wheels off the ground when said platform is lowered, and means whereby said lifting means move said wheel carrying means downwardly as the forward end of said elevating platform is lifted by said lifting means.

HERBERT J. FRAMHEIN.

REFERENCES CITED

The following references are of record in the file of this patent:

UNITED STATES PATENTS

| Number | Name | Date |
|---|---|---|
| 2,110,424 | Quayle | Mar. 8, 1938 |
| 2,234,925 | Hastings | Mar. 11, 1941 |
| 2,359,493 | Schreck | Oct. 3, 1944 |
| 2,361,544 | Hastings | Oct. 31, 1944 |
| 2,274,164 | Quayle | Feb. 24, 1942 |
| 1,997,327 | Warshaw | Apr. 9, 1935 |
| 2,266,913 | Simmons | Dec. 23, 1941 |
| 1,782,400 | Bolard | Nov. 25, 1930 |

FOREIGN PATENTS

| Number | Country | Date |
|---|---|---|
| 13,695 | Germany | (marked "No date") |